3,480,559
PRODUCTION OF 1-HALO-3,3-DIALKYL ALKANES USING AN EXCESS OF ETHYLENE
Emmett H. Burk, Jr., Glenwood, and William D. Hoffman, Park Forest, Ill., assignors to Sinclair Research, Inc., New York, N.Y., a corporation of Delaware
No Drawing. Continuation-in-part of application Ser. No. 314,601, Oct. 8, 1963. This application July 17, 1967, Ser. No. 653,679
Int. Cl. B01j 11/78; C07c 17/28
U.S. Cl. 252—431
4 Claims

ABSTRACT OF THE DISCLOSURE

The present invention provides a process for reacting a tertiary-alkyl halide with ethylene to form 1-halo-3,3-dialkyl alkanes. The reaction requires that the reactants be combined with a Friedel-Crafts catalyst at low temperature. The present invention comprises the discovery that essentially quantitative yields are provided if at the inception of ethylene consumption, an excess of at least about 75 moles of ethylene per mole of catalyst per hour is provided.

---

This application is a continuation-in-part of S.N. 314,601, filed Oct. 8, 1963 now abandoned.

This invention is directed to a method of forming an active catalyst for the production of 1-halo-3,3-dialkyl alkanes by the condensation of ethylene and tertiary alkyl halides.

The production of 1-halo-3,3-dialkyl alkanes by the condensation reaction of a lower molecular weight tertiary alkyl halide and ethylene in the presence of a Friedel-Crafts catalyst such as aluminum chloride is a known process. Although there have appeared a few isolated reports to satisfactory conversions and selective yields obtained by the reaction, the reaction in general has presented considerable difficulty to skilled technicians in the art. The major problem has been the inability in batch operations to consistently obtain selective yields of the final product with substantially complete conversion of the starting tertiary alkyl halide reactant. In many instances, after a relatively good start, the reaction is found to diminish quickly and stop at a point far from complete, or even adequate, conversion of the starting tertiary alkyl halide reactant. Attempts to remedy the slowdown of the reaction as, for instance, by the introduction of additional ethylene have failed. In fact introduction of additional ethylene at this stage has been found to kill the reaction in many cases.

It has now been found that in the condensation reaction in a batch operation of tertiary alkyl halides of 4 to 6 carbon atoms and ethylene to the corresponding 1-halo-3,3-dialkyl alkanes of 6 to 8 carbon atoms in the presence of catalytic amounts of aluminum chloride, an active catalyst for the condensation reaction can be formed through providing by at least the beginning of substantial ethylene consumption by reaction with the tertiary alkyl chloride, at least about 75, preferably at least about 100, moles of ethylene per mole of aluminum chloride per hour. The active catalyst formed in situ by the method of this invention has been found to give consistently high, selective yields of the 1-halo-3,3-dialkyl alkanes with complete or substantially complete conversion of the tertiary alkyl halide reactant.

We have found that the presence of the defined large amounts of ethylene at the time substantial ethylene consumption by the tertiary alkyl halide begins, is necessary for the preparation of an active catalyst since it is essentially at this period in the overall condensation reaction that the active catalyst is formed. Absence of sufficient amounts of ethylene at this stage, on the other hand, apparently prepares an inefficient catalyst as manifested by the relatively poor selective yields and conversions obtained.

Although we do not intend to be bound by any theoretical explanation of the invention, we believe that where insufficient quantities of ethylene are present at the initial consumption of ethylene by the tertiary alkyl halide, an intermediate, or alternate, and less efficient catalyst is formed rather than the active catalyst of the invention. In other words, when aluminum chloride is put into a tertiary alkyl halide, it is believed that a slow reaction takes place during the induction period of the condensation to form a "catalyst intermediate" which "catalyst intermediate" needs ethylene in order to go to the active form of the catalyst. During the early stages of the induction period the amount of "catalyst intermediate" formed is small and consequently the amount of ethylene required to take it to the active form is small. However, the amount of "catalyst intermediate" builds up to a relatively large amount during the induction period so that at the point of initial substantial ethylene consumption at least about 75 or 100 moles of ethylene per mole of $AlCl_3$ per hour are required to take the large amounts of "catalyst intermediate" formed to the active catalyst.

Thus, provision of the large amounts of ethylene to form the active catalyst need not be effected until the tail end of the induction period but it is preferred to have an excess of the ethylene present from the very beginning. Once the active catalyst is formed, however, presence of the defined large amounts of ethylene no longer need be maintained. Thus, once the active catalyst has been formed stoichiometric quantities of ethylene to tertiary alkyl halide can be employed and the desired results obtained. Most advantageously, however, the tertiary alkyl halide is first saturated with ethylene prior to addition of the aluminum chloride and a sustained operation attained by maintaining the presence of at least 75 moles of the ethylene per mole of $AlCl_3$ per hour throughout the reaction. A particularly suitable rate, for example, is about 100 to 250 moles of ethylene per mole of $AlCl_3$ per hour.

As aforementioned the tertiary alkyl halides of the invention contain 4 to 6 carbon atoms and include, for instance, tertiary butyl halide, tertiary amyl halide and tertiary hexyl halide. The halide substituent of the reactant is a halogen of 17 to 53 atomic number, i.e. chlorine, bromine and iodine. The preferred halide is the chloride and the preferred tertiary alkyl halide, tertiary butyl chloride.

The aluminum chloride employed in the condensation reaction is present in amounts sufficient to catalyze the reaction, the amount generally falling in the range of about 0.1 to 5, preferably about 0.5 to 3, percent by weight based on the tertiary alkyl halide charge. If desired an inert diluent or solvent for the catalyst can also be employed. Suitable inert hydrocarbon diluents include, for instance, alkanes of 3 to 8 carbon atoms such as propane, butane, pentane, hexane, etc. A drop in the reaction temperature or a slowing in the reaction rate can be corrected by the incremental addition of more aluminum chloride catalyst. Usually no more than about 0.1 to 1 percent by weight based on the tertiary alkyl halide reactant per addition is required.

The reaction can be effected employing reaction temperatures in the range of about 5 to 50, preferably 15 to 30° F. and atmospheric pressures, although subatmospheric or superatmospheric pressures can be used, if desired. Superatmospheric pressures may give increased selectivity due to liquid phase ethylene. After the reaction has gone essentially to completion, the resulting 1-halo- 3,3-dialkyl alkane product can be separated from the residual catalyst oil as by washing with water, alcohol, dilute aqueous caustic soda or other suitable hydrolyzing and washing methods. The catalyst oil separated can be stored for use in the next batch reaction.

The following examples are included to further illustrate the improved process of the present invention.

EXAMPLE I

To a 2-liter fluted flask, fitted with a stirrer, thermowell, gas inlet and gas outlet, there was charged 506 grams of t-butyl chloride cooled to −7° C. To this was added 12.0 grams of $AlCl_3$, ethylene addition was immediately begun at a rate of 0.3 moles $C_2$/mole t-butyl chloride per hour with the reaction temperature maintained between −5 to 0° C. After about 15 minutes a slight uptake of ethylene was noticed and the addition of ethylene was continued at the same rate. During this time ethylene and HCl evolved from the reaction flask. A very mildly exothermic and sluggish reaction occurred. Samples taken from the mixture at various intervals were analyzed by gas chromatography, the results of which are shown below.

|  | Time After Start of $C_2$ Addition (hrs.) | | | | | | |
| --- | --- | --- | --- | --- | --- | --- | --- |
|  | 0.50 | 1.00 | 1.50 | 2.50 | 3.00 | 3.50 | 4.50 |
| Components, Wt. percent: | | | | | | | |
| t-Butyl chloride | 52.6 | 35.8 | 30.2 | 25.6 | 17.4 | 20.9 | 22.8 |
| t-Amyl chloride | 0.3 | 0.4 | 0.3 | 0.4 | 0.5 | 0.4 | 0.5 |
| 2,3-dimethyl-1-chloro butane | 3.4 | 3.2 | 2.7 | 2.6 | 2.5 | 2.8 | 2.4 |
| Neohexyl chloride | 26.5 | 45.7 | 54.1 | 59.2 | 67.1 | 64.5 | 61.4 |

EXAMPLE II

In a second experiment in the similar equipment containing 40.5 parts t-butyl chloride to 1 part $AlCl_3$ held at −5° C., ethylene was introduced at the rate of .3 mole of ethylene per mole of t-butyl chloride per hour. After about 15 minutes ethylene uptake began and the reaction became exothermic. At this point, despite the fact the ethylene and HCl were evolving from the flask, the ethylene rate was nevertheless increased to 4 moles of ethylene per mole of t-butyl chloride per hour. A very rapid reaction began with no loss of ethylene or HCl from the flask. Total immersion of the flask in a Dry Ice bath was necessary in order to maintain its temperature to −5 to 0° C. After a total time of 30 minutes the contents of the flask had the following composition:

| | Weight percent |
| --- | --- |
| t-Butyl chloride | 2.9 |
| t-Amyl chloride | 0.3 |
| 2,3 dimethyl-1-chlorobutane | 2.5 |
| Neohexyl chloride | 94.3 |

A comparison of the data of Examples I and II illustrates the surprisingly fast reaction and high selective yields of desired product obtainable when the method of the present invention is utilized to form the catalyst for the reaction. Example I represents the prior art method, that is, the introduction of ethylene and the fixing of the ethylene introduction rate at that which provides an excess as indicated by the evolution of ethylene from the reaction flask. Heretofore, provision of ethylene at an increased rate has been considered unnecessary and wasteful since the evolution of ethylene from the reaction has meant more ethylene is already present than is capable of reacting. As shown by the data the reaction is sluggish compared to the method of the present invention (Example II) and fails to provide the high selective yields of desired product.

It is claimed:

1. A method of forming an active catalyst for the production of 1-halo-3,3-dialkyl alkanes of 6 to 8 carbon atoms by the condensation of a tertiary alkyl halide of 4 to 6 carbon atoms and of a halogen having an atomic number of 17 to 53, and ethylene at a temperature of about 5 to 50° F. and in the presence of a catalytic amount of aluminum chloride which consists essentially of providing at the beginning of ethylene consumption by said tertiary alkyl halide at least about 75 moles of ethylene per mole of aluminum chloride per hour.

2. The method of claim 1 wherein the halogen is chlorine.

3. The method of claim 2 wherein the moles of ethylene is at least about 100.

4. The method of claim 3 wherein the tertiary alkyl halide is tertiary butyl chloride.

References Cited

UNITED STATES PATENTS 2,419,500    4/1947    Peterson et al.
2,533,053   12/1950    Schmerling.

PATRICK P. GARVIN, Primary Examiner

U.S. Cl. X.R.

252—429, 442; 260—658